United States Patent
Maguire et al.

(10) Patent No.: US 7,611,432 B2
(45) Date of Patent: Nov. 3, 2009

(54) HYBRID POWERTRAIN

(75) Inventors: Joel M. Maguire, Northville, MI (US); Norman K. Bucknor, Troy, MI (US); Madhusudan Raghavan, West Bloomfield, MI (US); Paul M. Najt, Bloomfield Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 158 days.

(21) Appl. No.: 11/463,054

(22) Filed: Aug. 8, 2006

(65) Prior Publication Data
US 2008/0039259 A1 Feb. 14, 2008

(51) Int. Cl.
F16H 37/06 (2006.01)

(52) U.S. Cl. .......................... 475/5; 475/282; 475/288; 475/290; 475/329; 475/330

(58) Field of Classification Search .................. None
See application file for complete search history.

(56) References Cited

U.S. PATENT DOCUMENTS

| | | | |
|---|---|---|---|
| 4,169,435 A * | 10/1979 | Faulconer, Jr. ............ 123/48 A |
| 5,058,536 A | 10/1991 | Johnston |
| 5,558,595 A | 9/1996 | Schmidt et al. |
| 5,730,676 A * | 3/1998 | Schmidt ........................ 475/5 |
| 5,832,886 A * | 11/1998 | Grob et al. ............... 123/90.17 |
| 5,931,757 A | 8/1999 | Schmidt |
| 6,182,619 B1 | 2/2001 | Spitzer et al. |
| 6,189,493 B1 | 2/2001 | Gray, Jr. |
| 6,230,671 B1 | 5/2001 | Achterberg |
| 6,418,707 B1 | 7/2002 | Paul |
| 7,017,536 B2 | 3/2006 | Scuderi |
| 7,034,481 B2 * | 4/2006 | Imai ........................... 318/376 |
| 7,273,435 B2 * | 9/2007 | Raghavan et al. ........... 475/151 |
| 7,288,041 B2 * | 10/2007 | Bucknor et al. ............. 475/151 |
| 2003/0100395 A1 * | 5/2003 | Hiraiwa ......................... 475/5 |
| 2005/0247272 A1 | 11/2005 | Carlson |
| 2006/0046886 A1 * | 3/2006 | Holmes et al. ................. 475/5 |
| 2006/0276289 A1 * | 12/2006 | Hirata et al. ................... 475/5 |

* cited by examiner

*Primary Examiner*—David D. Le (57) ABSTRACT

A powertrain is provided, comprising: an internal combustion engine and an electro-mechanical transmission. The internal combustion engine has two torque output nodes operatively connected to two torque input nodes of the electro-mechanical transmission. The transmission comprises first and second electrical machines operatively connected to first and second planetary gear sets that are selectively operative to transmit torque to an output shaft. The two torque output nodes of the engine comprise an engine block comprising a cylinder with a pair of opposed pistons inserted therein, and each piston operatively connected to one of a first and a second crankshaft. The first and second crankshafts are operatively connected.

22 Claims, 6 Drawing Sheets

HYBRID POWERTRAIN

TECHNICAL FIELD

This invention pertains generally to a gasoline/electric hybrid powertrain system, and more specifically to architectures thereof.

BACKGROUND OF THE INVENTION

Various hybrid propulsion systems for vehicles use electrical energy storage devices to supply electrical energy to electrical machines, which are operable to provide motive torque to the vehicle, often in conjunction with an internal combustion engine. One such hybrid powertrain architecture comprises a two-mode, compound-split, electro-mechanical transmission which utilizes an input member for receiving power from a prime mover power source and an output member for delivering power from the transmission to a vehicle driveline. First and second electric machines, i.e. motor/generators, are operatively connected to an energy storage device for interchanging electrical power therebetween. A control unit is provided for regulating the electrical power interchange between the energy storage device and the electric machines. The control unit also regulates electrical power interchange between the first and second electric machines.

Powertrain systems which incorporate a plurality of torque-generative devices attached to a transmission device have been proposed for use as vehicle propulsion systems. The torque-generative devices typically include internal combustion engines and electrical machines powered using electrical energy storage devices, e.g. high voltage batteries. Torque outputs of the torque-generative devices are combined in the transmission device to supply motive torque to a driveline of the vehicle.

A typical electrically-variable transmission (EVT) splits mechanical power between an input shaft and an output shaft into a mechanical power path and an electrical power path by means of differential gearing. The mechanical power path may include clutches and additional gears. The electrical power path may employ two electrical power units, each of which may operate as a motor or as a generator. The EVT can be incorporated into a propulsion system for a hybrid electric vehicle using an electrical energy storage device. A typical hybrid propulsion system uses electrical energy storage devices and an internal combustion engine as power sources. The batteries are connected with the electrical drive units through an electronic control system which distributes electrical power as required. The control system also has connections with the engine and vehicle to determine operating characteristics, or operating demand, so that the electrical power units are operated properly as either a motor or a generator. When operating as a generator, the electrical power unit accepts power from either the vehicle or the engine and stores power in the battery, or provides that power to operate another electrical device or another electrical power unit on the vehicle or on the transmission.

There is a need for a method and apparatus to improve torque and power efficiency of a transmission device, to effectively transmit torque from a plurality of torque-generative devices to an output of the transmission, to provide motive torque to a vehicle.

SUMMARY OF THE INVENTION

In accordance with an embodiment of the invention, there is provided a powertrain, comprising: an internal combustion engine and an electro-mechanical transmission. The internal combustion engine has two torque output nodes operatively connected to two torque input nodes of the electro-mechanical transmission. The transmission comprises first and second electrical machines operatively connected to first and second planetary gear sets that are selectively operative to transmit torque to an output shaft. The engine comprises an engine block comprising a cylinder with a pair of opposed pistons inserted therein, and each piston operatively connected to one of a first and a second crankshaft. The first and second crankshafts are operatively connected, and comprise the two torque output nodes.

An aspect of the invention comprises the operatively connected first and second crankshafts selectively controllable to effect a variable compression ratio in the internal combustion engine.

Another aspect of the invention includes the internal combustion engine having two torque output nodes operatively connected to two torque input nodes of the electro-mechanical transmission device wherein the first torque input node comprises a torque input to the first planetary gear set; and, the second torque input node comprises a torque input to the second planetary gear set.

Another aspect of the invention comprises the outputs of the first and second planetary gear sets operatively connected in parallel to transmit torque to the output shaft. Alternatively, the second crankshaft is operatively connected with a second planetary gear set operatively connected to the output shaft to transmit torque thereto.

Another aspect of the invention comprises a plurality of rotational brake devices operatively connected to the planetary gear sets, and, a plurality of clutch devices operatively connected to the planetary gear sets. Selective actuation of the rotational brake devices and the clutch device effects one of a direct drive fixed gear ratio, an underdrive fixed gear ratio, an overdrive fixed gear ratio, a reverse fixed gear ratio, and a continuously variable ratio operation.

The benefits of the system described herein include a powertrain having a compact shape that is substantially a right parallelepiped thus permitting ease of packaging. The exemplary internal combustion engine having a variable compression ratio with two output nodes to the transmission and operative in a dilute combustion or lean air/fuel ratio region results in improved fuel economy and reduction in exhaust emissions. The engine is controlled to operate in its most efficient mode while supplementing or replacing engine torque via electrical motor-generators. The electro-mechanical transmission uses the electrical motor-generators to replace or augment engine torque as needed and capture braking energy via regenerative braking schemes, and is selectively operative in fixed ratios and electrically variable modes. The integrated hybrid powertrain has operating modes comprising a battery-powered reverse, an electrically variable reverse, and a fixed-gear reverse, and, a battery-powered forward launch, an electrically variable forward, and a fixed-gear forward.

These benefits and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the embodiments of which are described in detail and illustrated in the accompanying drawings which form a part hereof, and wherein.

DETAILED DESCRIPTION OF THE EMBODIMENTS

Referring now to the drawings, wherein the showings are for the purpose of illustrating the invention only and not for the purpose of limiting the same, FIGS. 1-6 each depict an exemplary powertrain system in accordance with the present invention. The invention comprises a powertrain device operative to transmit torque to a driveline 98, comprising an internal combustion engine 10 having two torque output nodes operatively connected to an electro-mechanical transmission device 50 having two torque input nodes. The electro-mechanical transmission 50 comprises first and second electrical machines 60, 70 operatively connected to first and second planetary gear sets selectively operative to transmit torque to an output shaft operatively connected to the driveline 98.

The internal combustion engine 10 having two torque output nodes preferably comprises one or more cylinders 8 formed in an engine block. A pair of opposed moveable pistons 12, 14 are inserted in each cylinder 8, such that the piston tops of each moveable piston 12, 14 face or oppose each other and form a single combustion chamber 6 of variable volume therebetween. The variable volume combustion chamber has boundaries that are defined by the cylinder walls and the tops of the moveable pistons 12, 14. The combustion chamber has an intake port for inlet of fresh air, an exhaust port for exhaust of combusted gases, a fuel injector device, and a spark plug in those configurations requiring a spark plug. Each piston 12, 14 is operatively connected via a connecting rod to one of the crankshafts 16, 22. Each crankshaft 16, 22 is mounted at a distal end of the cylinder block using conventional bearing devices to permit rotation, and the longitudinal axes of the crankshafts 16, 22 are preferably parallel. Each crankshaft 16, 22 is operatively connected to a gear 18, 24 respectively, which are rotationally coupled. The crankshafts 16, 22 shown herein are rotationally coupled using a chain device 20, although it is understood that the rotational coupling can be accomplished with other devices. In embodiments wherein variable compression ratio ('VCR') is implemented, an actuator comprising a controllable chain tension device (not shown) is operative to selectively change relative lengths of tight and slack spans of the chain device 20. This acts to modify relative rotation and phasing of the crankshafts 16, 22 to vary the compression ratio in the combustion chamber 6 of the cylinder. A change or modification in relative rotation of the crankshafts 16, 22 changes locations of the tops of the pistons 12, 14 relative to each other, thus varying the compression ratio. The VCR actuator can be either hydraulically actuated or electrically actuated using a worm-drive, and preferably includes capability for self-locking at specific points of crankshaft phasing, to fix the compression ratio at a known rate. The engine 10 preferably comprises a compression-ignition two-stroke configuration, and includes direct injection of fuel and wherein the intake and exhaust ports are selectively opened each engine rotation. Alternatively, the engine 10 comprises a homogeneous-charge compression ignition engine, including direct injection of fuel and spark ignition for supplemental support of combustion. Alternatively, the engine 10 comprises a stratified-fuel-charge engine. An engine control module ('ECM') (not shown) controls operation of the engine, including the various actuators.

The electro-mechanical transmission device 50 having two torque input nodes preferably comprises an electrically variable transmission device having two electrical machines 60, 70, described hereinafter. The electrical machines 60, 70 each comprises a motor/generator device operative to generate motive torque from electrical energy transmitted from an electrical energy storage device ('ESD') (not shown), or generate electrical energy from motive torque transmitted through the driveline 98. The transmission device is operative to selectively transmit torque input from each of the crankshafts 16, 22 via shafts 52, 54 to each of the two electrical machines 60, 70 and to the driveline 98 as motive torque, or, alternatively, to the electrical machines 60, 70 for electrical energy generation. The generated electrical energy can be stored in the electrical energy storage device or used by the other electrical machine to generate motive torque. Torque transmitted from the driveline 98 can be used to generate electrical energy for storage in the electrical energy storage device. A transmission control module ('TCM') or other control module controls operation of the transmission and the electrical machines.

Referring again to FIGS. 1-6, embodiments of the electro-mechanical transmission device 50 having two torque input nodes and comprising first and second electrical machines 60, 70 are depicted. In each embodiment, the first electrical machine 60 comprises first planetary gear set 68 and an electrical motor/generator device comprising rotor 64 and stator 66. The first planetary gear set 68 and a second planetary gear set 78 each comprise known elements including ring gears 69, 79, sun gears 65, 75, and a plurality of planet or carrier gears 67, 77, respectively. With regard to each of the planetary gear sets 68, 78, the ring gear circumscribes the sun gear, with the plurality of planet or carrier gears rotatably mounted on a carrier device such that each of the carrier or planet gears meshingly engages both the ring gear and the sun gear. In each planetary gear set, the ring gear, the sun gears, and the carrier device are preferably co-axial.

Figure 1:
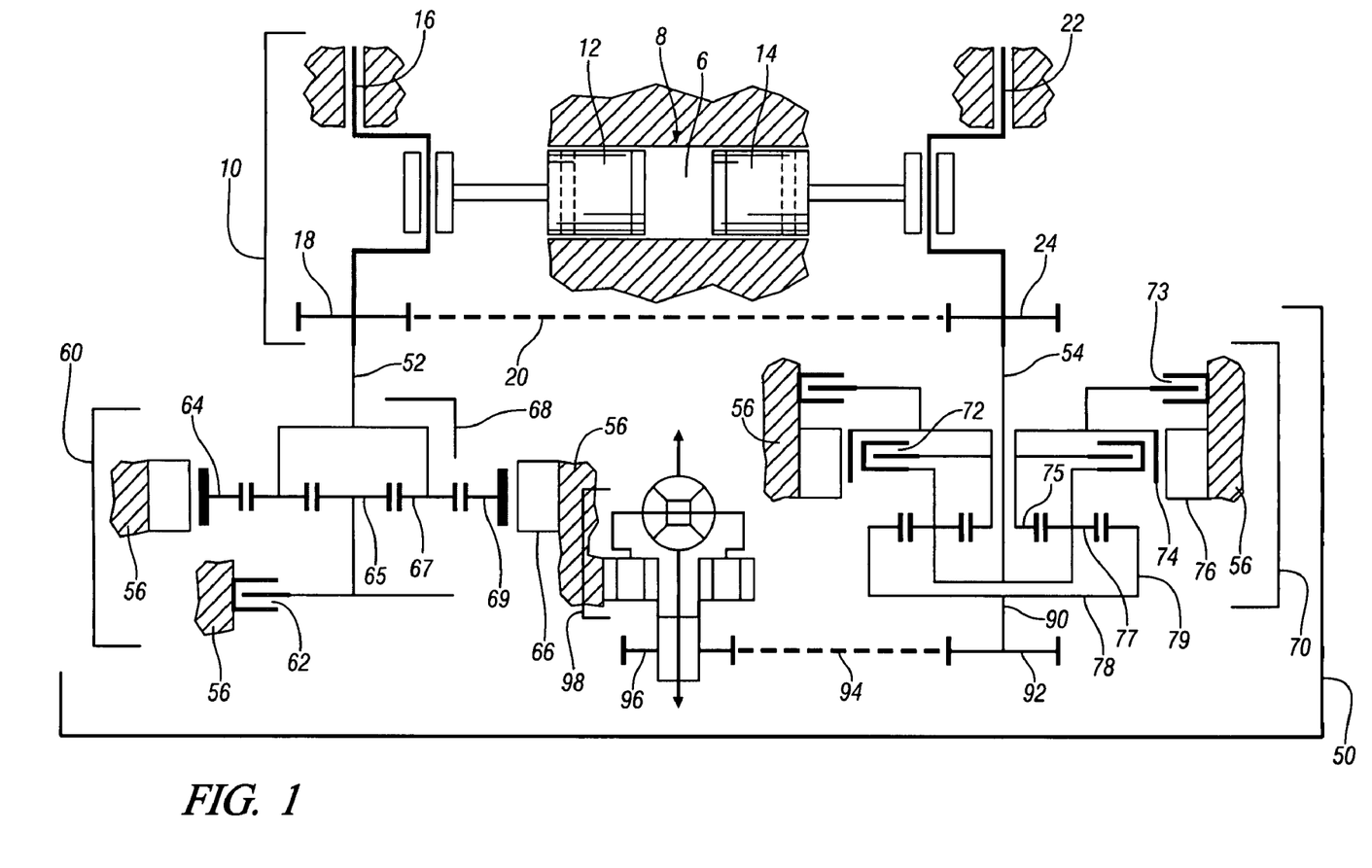
FIGS. 1-6 comprise schematic diagrams of exemplary powertrain architectures, in accordance with the present invention.

Referring now to FIG. 1, an embodiment of the electro-mechanical transmission device 50 having two torque input nodes and comprising first and second electrical machines 60, 70 is depicted. The first electrical machine 60 comprises first planetary gear set 68 and electrical motor/generator device comprising rotor 64 and stator 66. The first planetary gear set 68 and the second planetary gear set 78 each comprise known elements including ring gears 69, 79, sun gears 65, 75, and a plurality of planet or carrier gears 67, 77, respectively. Carrier gears 67 of the first planetary gear set 68 are operatively connected to the first crankshaft 16 via shaft 52. Electrical motor rotor 64 is attached to ring gear 69 of the planetary gear 68. Electrical motor stator 66 is grounded to case 56 of the transmission 50. A controllable clutch brake device 62 is connected to sun gear 65 of the planetary gear 68 and operative to selectively ground the sun gear to case 56. The second electrical machine 70 comprises the second planetary gear set 78 and an electrical motor/generator device comprising rotor 74 and stator 76. Carrier gears 77 of the second planetary gear set 78 are operatively connected to the second crankshaft 22 via shaft 54. Sun gear 75 of the planetary gear 78 is attached to electrical motor rotor 74, selectively attached to the carrier gears of the planetary gear 78 using a first clutch 72, and selectively attached to case ground 56 using a second controllable brake 73. Electrical motor stator 76 is grounded to case 56 of the transmission 50. The ring gear 79 of the planetary gear set 78 connects to output shaft 90, which is operatively connected to drive gear 92 connected to driveline 98 via chain 94 and gear 96. This configuration comprises a series-hybrid connection, wherein mechanical torque from the engine 10 to the driveline 98 is transmitted in series through the second machine 70 of the transmission 50.

Figure 2:
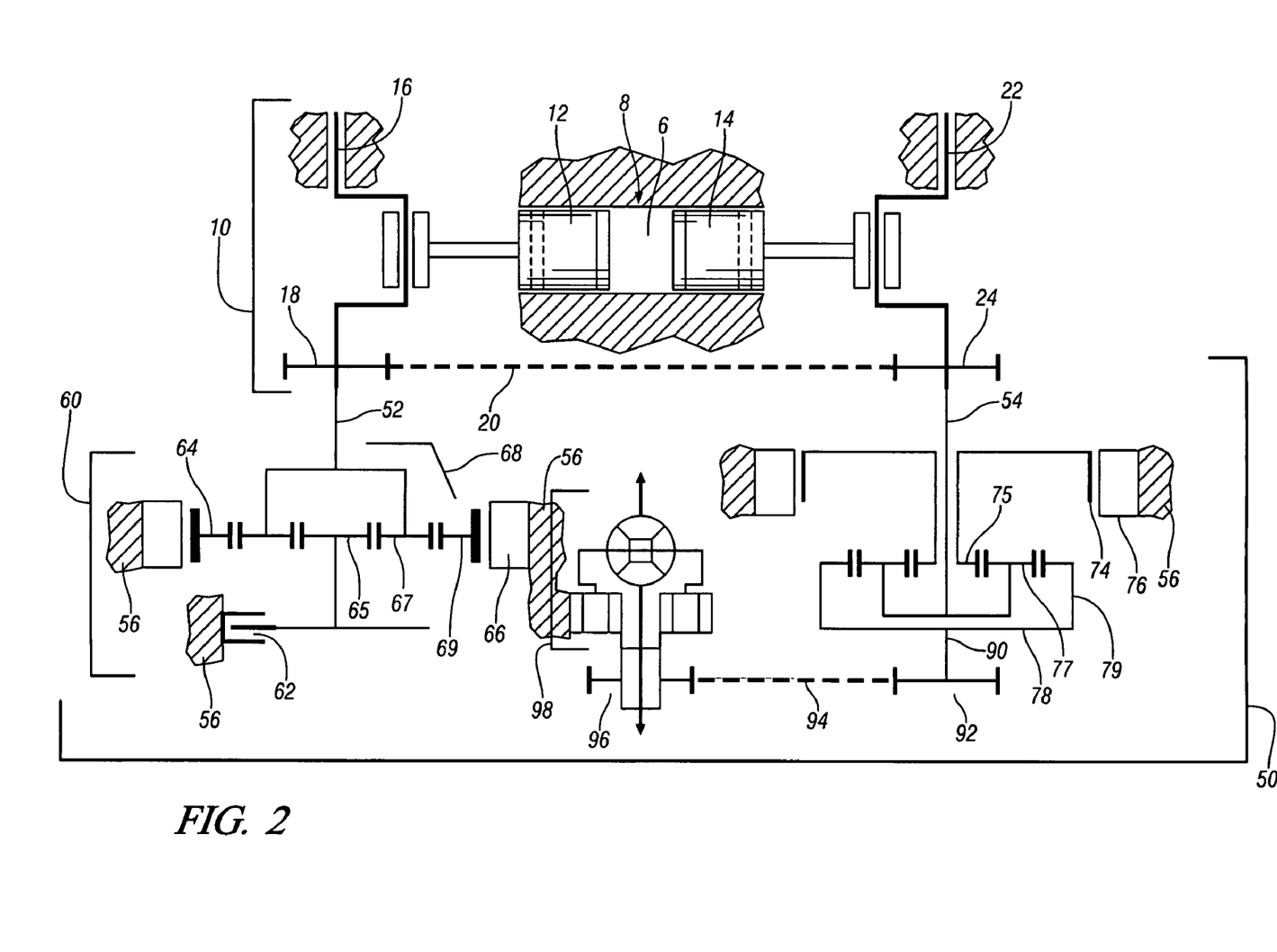

Referring now to FIG. 2, another embodiment of the electro-mechanical transmission device 50 having two torque input nodes and comprising first and second electrical machines 60, 70 is depicted. The first electrical machine 60 comprises first planetary gear set 68 and the electrical motor/generator device comprising rotor 64 and stator 66. Carrier gears 67 of the first planetary gear set 68 are operatively connected to the first crankshaft 16 via shaft 52. Electrical motor rotor 64 is attached to the ring gear 69 of the planetary gear 68. Electrical motor stator 66 is grounded to case 56 of the transmission 50. The controllable clutch brake device 62 is connected to the sun gear 65 of the planetary gear 68 and operative to selectively ground the sun gear to case 56. The second electrical machine 70 comprises the second planetary gear set 78 and the electrical motor/generator device comprising rotor 74 and stator 76. Carrier gears 77 of the second planetary gear set 78 are operatively connected to the second crankshaft 22 via shaft 54. Sun gear 75 of the planetary gear 78 is attached to electrical motor rotor 74. Electrical motor stator 76 is grounded to case 56 of the transmission 50. The ring gear 79 of the planetary gear set 78 connects to output shaft 90, which is operatively connected to drive gear 92 connected to driveline 98 via chain 94 and gear 96. This configuration achieves minimum hardware content without fixed forward gear ratios, and leads to low clutch spin losses but potentially requiring a higher percentage of motive torque generated through the electrical system. This configuration comprises a series-hybrid connection, wherein mechanical torque from the engine 10 to the driveline 98 is transmitted in series through the second machine 70 of the transmission 50.

Figure 3:
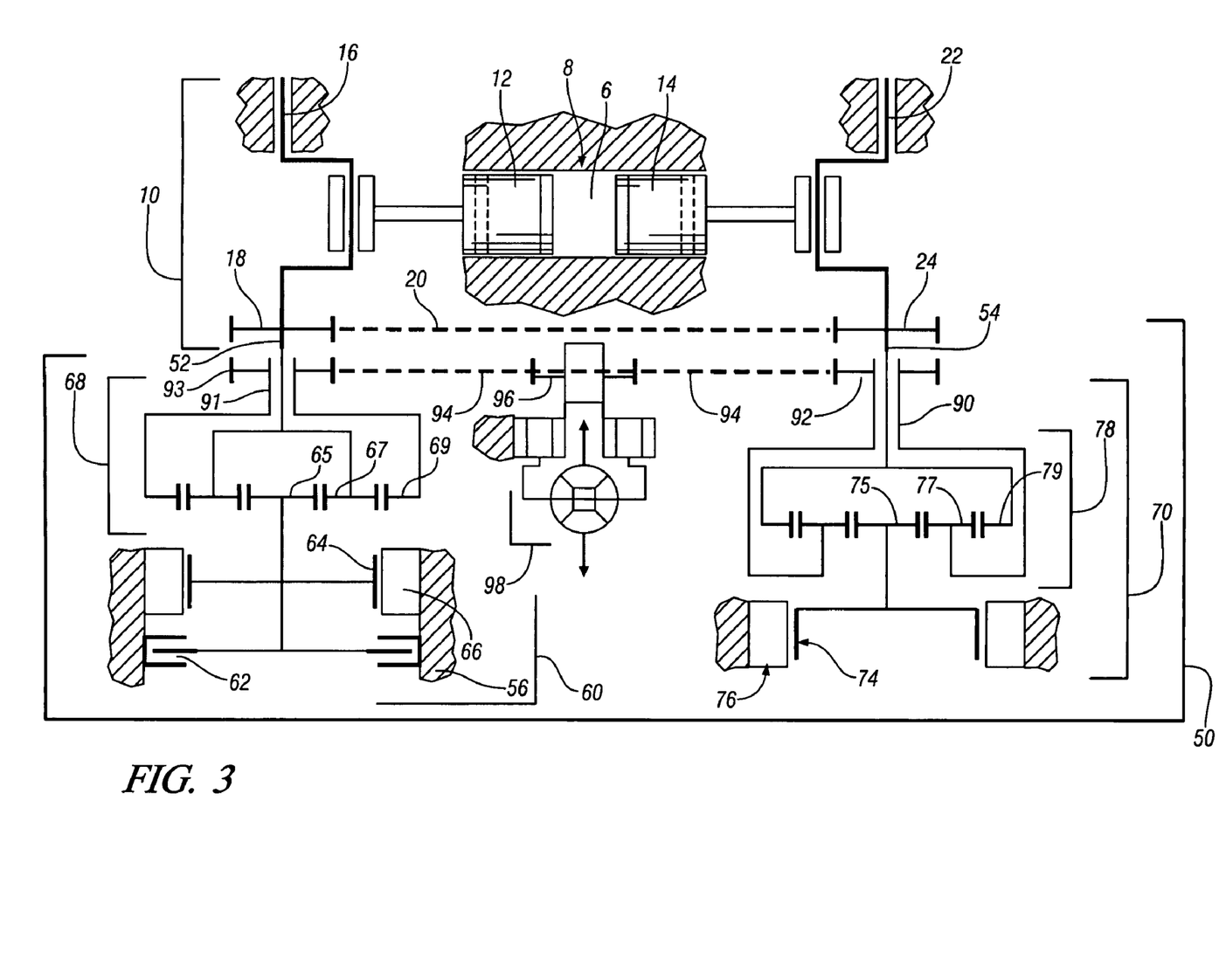

Referring now to FIG. 3, another embodiment of the electro-mechanical transmission device 50 having two torque input nodes and comprising first and second electrical machines 60, 70 is depicted. The first electrical machine 60 comprises first planetary gear set 68 and the electrical motor/generator device comprising rotor 64 and stator 66. Carrier gears 67 of the first planetary gear set 68 are operatively connected to the first crankshaft 16 via shaft 52. Electrical motor rotor 64 is attached to the sun gear 65 of the planetary gear 68. Electrical motor stator 66 is grounded to case 56 of the transmission 50. The clutch brake device 62 is connected to the sun gear 65 of the first planetary gear set 68 and operative to selectively ground the sun gear to case 56. The ring gear 69 is connected to a drive gear 93 via shaft 91. Drive gear 93 is operatively connected to driveline 98 via chain 94 and gear 96, along with drive gear 92 from the second electrical machine 70. The second electrical machine 70 comprises the second planetary gear set 78 and the electrical motor/generator device comprising rotor 74 and stator 76. The ring gear 79 of the second planetary gear set 78 is operatively connected to the second crankshaft 22 via shaft 54. The sun gear 75 of the planetary gear 78 is attached to electrical motor rotor 74. The carrier gears 77 of the planetary gear 78 operatively connect to output shaft 90, which is operatively connected to drive gear 92 connected to driveline 98 via chain 94 and gear 96. Electrical motor stator 76 is grounded to case 56 of the transmission 50. This configuration permits uses of smaller diameter electrical machines and minimizes torque requirements. This configuration comprises a parallel-hybrid connection, wherein mechanical torque from the engine 10 to the driveline 98 is transmitted in parallel through the first and second machines 60, 70 of the transmission 50.

Figure 4:
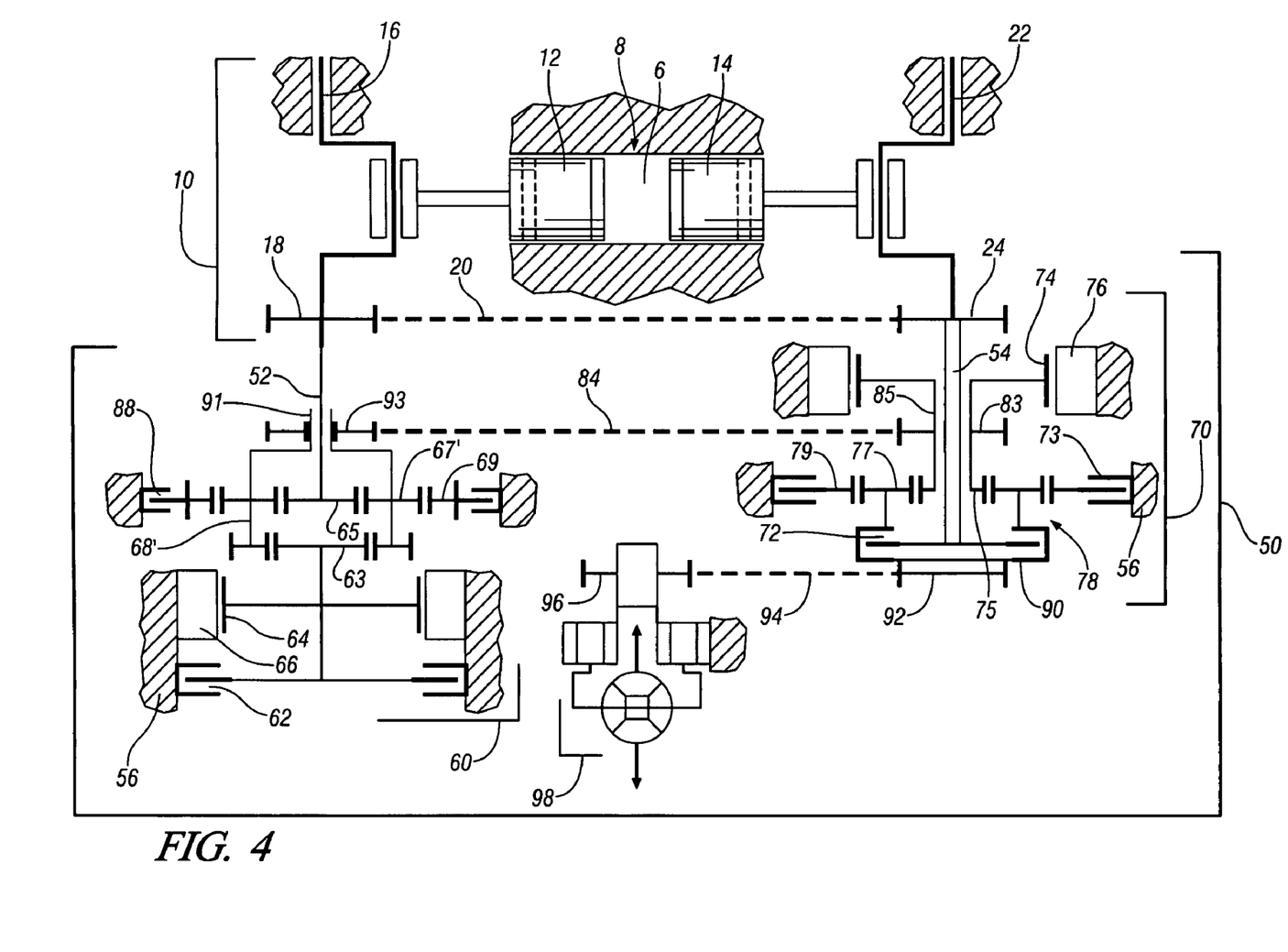

Referring now to FIG. 4, another embodiment of the electro-mechanical transmission device 50 having two torque input nodes and comprising first and second electrical machines 60, 70 is depicted. The first electrical machine 60 comprises first planetary gear set 68', comprising a compound planetary gear set with two sun gears 63, 65 of different diameters, and the electrical motor/generator device comprising rotor 64 and stator 66. The first sun gear 65 of the first planetary gear set 68 is operatively connected to the first crankshaft 16 via shaft 52. Electrical motor rotor 64 is attached to the second sun gear 63 of the planetary gear 68. Electrical motor stator 66 is grounded to case 56 of the transmission 50. The clutch brake device 62 is connected to the second sun gear 63 of the first planetary gear 68 and operative to selectively ground the second sun gear to case 56. The ring gear 69 is connected to a brake device 88 selectively operative to ground the ring gear to the case 56. Drive gear 93 connects to the carrier gears 67' via shaft 91. Drive gear 93 is operatively connected to drive gear 83 of the second motor/generator 70 via drive chain 84. The second electrical machine 70 comprises the second planetary gear set 78 and the electrical motor/generator device comprising rotor 74 and stator 76. The second crankshaft 22 connects to shaft 54, which selectively connects to the carrier gears 77 and output shaft 90 via clutch 72. The ring gear 79 of the second planetary gear set 78 is selectively grounded using brake 73. The sun gear 75 of the planetary gear 78 is attached to electrical motor rotor 74 via shaft 85 and to gear 83, thus operatively connected to the first electrical machine 60. The carrier gears 77 of the planetary gear 78 operatively connect to output shaft 90, which is operatively connected to drive gear 92 connected to driveline 98 via chain 94 and gear 96. Electrical motor stator 76 is grounded to case 56 of the transmission 50. The selective actuation of three brake devices and clutch in conjunction with the electrical machines results in a deep underdrive fixed ratio, a direct drive ratio, and a mechanical reverse ratio. The deep underdrive fixed ratio is achieved by selectively actuating brake devices B1 73 and B2 62 in this configuration. The direct drive ratio is achieved by selectively actuating clutch 72 in this configuration. The mechanical reverse ratio is achieved by selectively actuating brake devices B3 88 and B1 73 in this configuration. This configuration comprises a parallel-hybrid connection, wherein mechanical torque from the engine 10 to the driveline 98 is transmitted in parallel through the first and second machines 60, 70 of the transmission 50.

Figure 5:
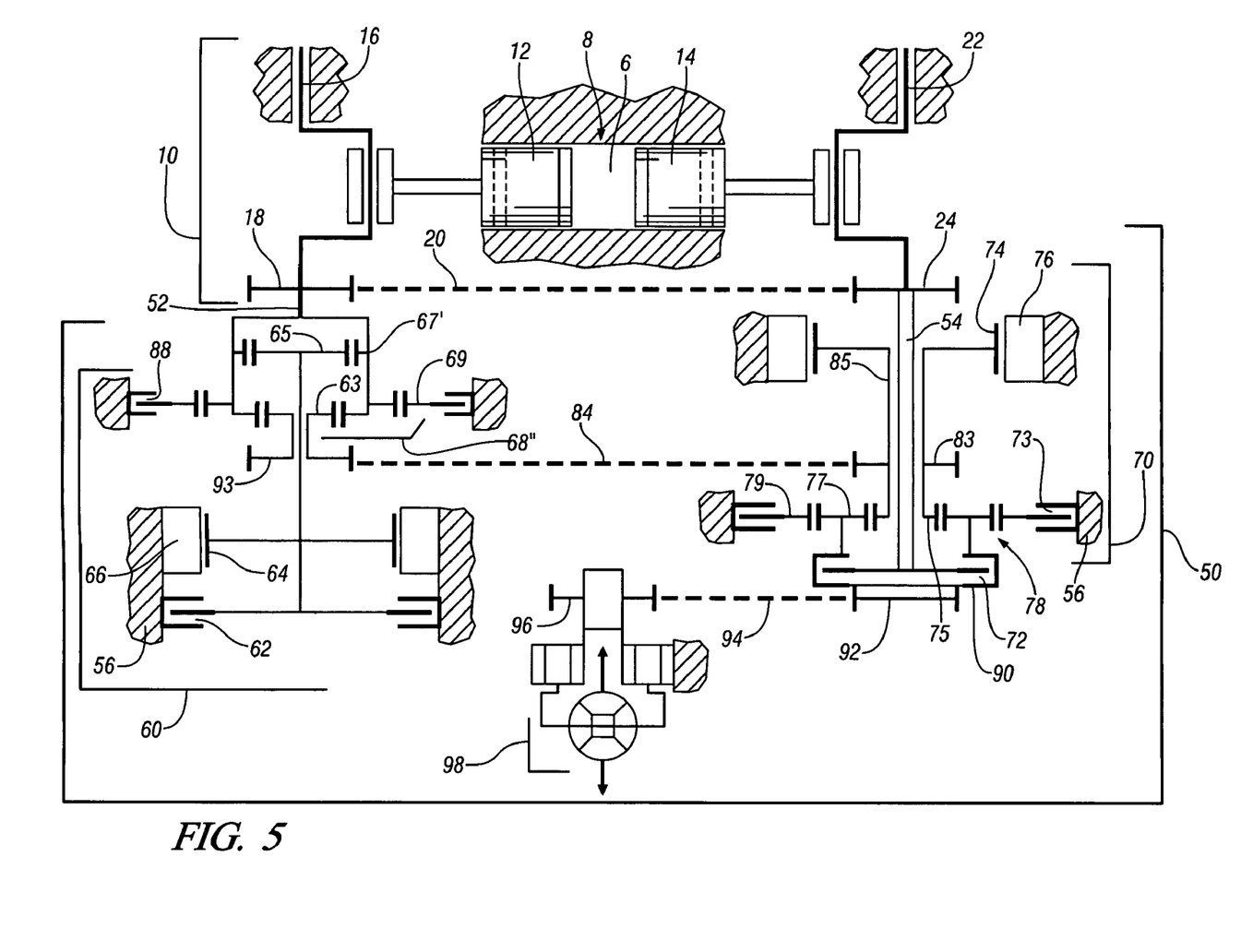

Referring now to FIG. 5, another embodiment of the electro-mechanical transmission device 50 having two torque input nodes and comprising first and second electrical machines 60, 70 is depicted. The first electrical machine 60 comprises first planetary gear set 68", comprising a compound planetary gear set with two sun gears 63, 65 of different diameters, and the electrical motor/generator device comprising rotor 64 and stator 66. The carrier gears 67' of the first planetary gear set 68 are operatively connected to the first crankshaft 16 via shaft 52. Electrical motor rotor 64 is attached to the first sun gear 65 of the planetary gear 68". Electrical motor stator 66 is grounded to case 56 of the transmission 50. The clutch brake device 62 is connected to the first sun gear 65 of the first planetary gear 68" and operative to selectively ground the first sun gear to case 56. The ring gear 69 is connected to brake device 88 selectively operative to ground the ring gear to the case 56. Drive gear 93 connects to second sun gear 63, and is operatively connected to drive gear 83 of the second motor/generator 70 via gear chain 84. The second electrical machine 70 comprises the second planetary gear set 78 and the electrical motor/generator device comprising rotor 74 and stator 76. The second crankshaft 22 connects to shaft 54, which selectively connects to the carrier gears 77 and output shaft 90 via clutch 72. The ring gear 79 of the second planetary gear set 78 is selectively grounded using brake 73. The sun gear 75 of the planetary gear 78 is attached to electrical motor rotor 74 via shaft 85 and to gear 83, thus operatively connected to the first electrical machine 60. The carrier gears 77 of the planetary gear 78 operatively connect to output shaft 90, which is operatively connected to drive gear 92 connected to driveline 98 via chain 94 and gear 96. Electrical motor stator 76 is grounded to case 56 of the transmission 50. The selective actuation of three brake devices and clutch in conjunction with the electrical machines in this configuration results in an overdrive fixed gear ratio, a direct drive ratio, and a mechanical reverse ratio. The overdrive fixed ratio is achieved by selectively actuating brake devices B2 62 and B1 73 in this configuration. The direct drive ratio is achieved by selectively actuating clutch 72 in this configuration. The mechanical reverse ratio is achieved by selectively actuating brake devices B3 88 and B1 73 in this configuration. This configuration comprises a parallel-hybrid connection, wherein mechanical torque from the engine 10 to the driveline 98 is transmitted in parallel through the first and second machines 60, 70 of the transmission 50.

Figure 6:
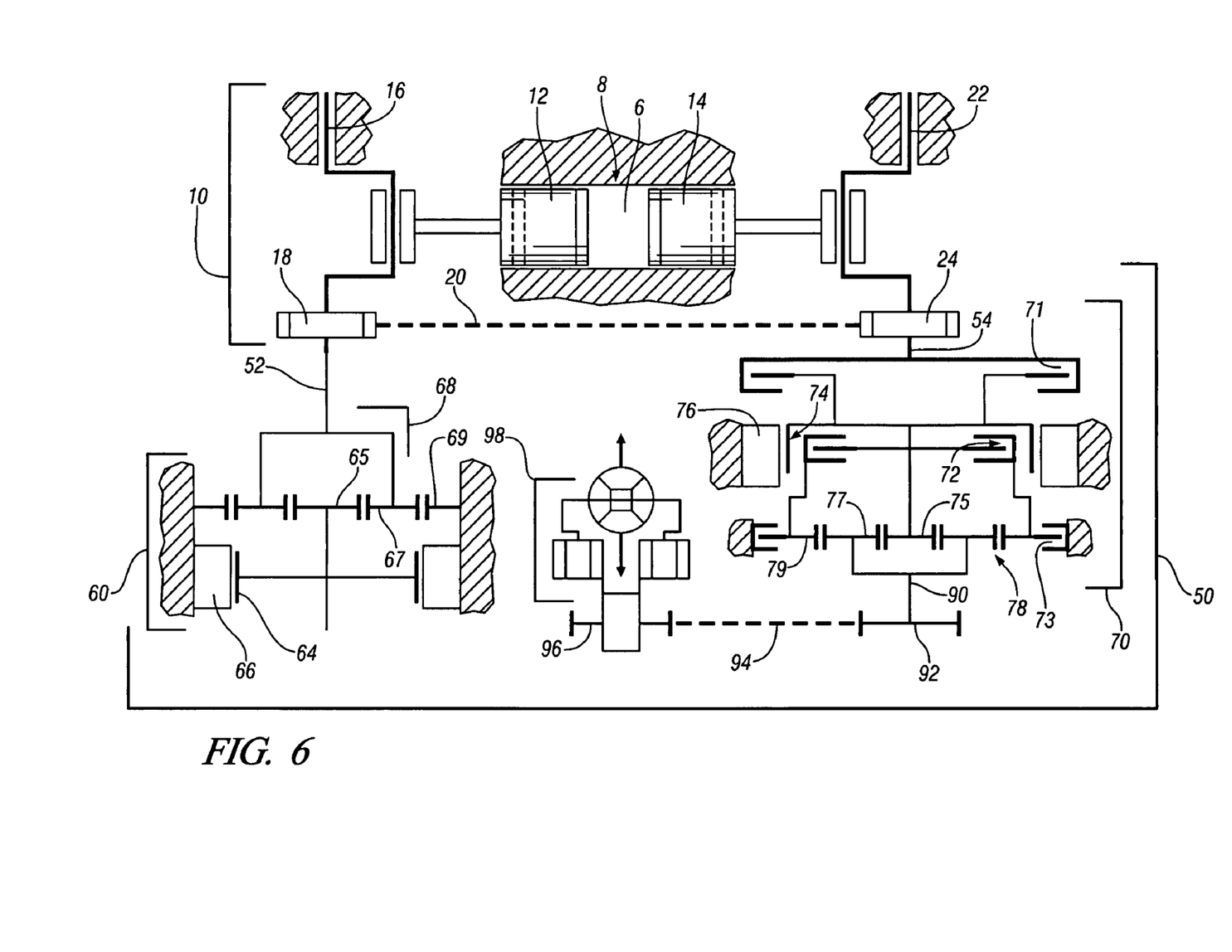

Referring now to FIG. 6, another embodiment of the electro-mechanical transmission device 50 having two torque input nodes and comprising first and second electrical machines 60, 70 is depicted. The first electrical machine 60 comprises first planetary gear set 68 and an electrical motor/generator device comprising rotor 64 and stator 66. Carrier gears 67 of the first planetary gear set 68 are operatively connected to the first crankshaft 16 via shaft 52. The ring gear 69 is grounded to the transmission case 56. Electrical motor rotor 64 is attached to the sun gear 65 of the planetary gear 68. Electrical motor stator 66 is grounded to case 56 of the transmission 50. The second electrical machine 70 comprises a second planetary gear set 78 and an electrical motor/generator device comprising rotor 74 and stator 76. The second crankshaft 22, via shaft 54, is selectively connected to the sun gear 75 of the second planetary gear set 78 via clutch 71. The sun gear 75 is attached to the rotor 74 and selectively connected to the ring gear 79 using a second clutch 72. The ring gear 79 is selectively connected to the case ground via brake 73. Electrical motor stator 76 is grounded to case 56 of the transmission 50. The carrier gears 77 of the planetary gear set 78 connect to output shaft 90, which is operatively connected to drive gear 92 connected to driveline 98 via chain 94 and gear 96. This configuration provides a selectable series/power-split arrangement. Selectively engaging clutch 71 provides a power-split arrangement and selectively disengaging clutch 71 results in a series-hybrid powertrain configuration.

The powertrain preferably includes a powertrain control system comprising a distributed control module architecture interacting via a local area communications network to provide ongoing control to the powertrain system, including the engine 10, the electrical machines 60, 70, and the clutches and brakes of the transmission 50 to meet an operator demand for power and output torque. The transmission 10 receives input torque from torque-generative devices, including the engine 10 and the electrical machines 60, 70, as a result of energy conversion from fuel or electrical potential stored in the electrical energy storage device ('ESD') which typically comprises one or more electrochemical batteries. The ESD is preferably sized based upon factors including regenerative requirements, application issues related to typical road grade and temperature, and, propulsion requirements such as emissions, power assist and electric range. The ESD is high voltage DC-coupled to a transmission power inverter module ('TPIM') via DC transfer conductor lines. Electrical current is transferable to or from the ESD in accordance with whether the ESD is being charged or discharged.

The electrical machines 60, 70 preferably comprise known motors/generator devices. In motoring control, the respective inverter receives current from the DC lines and provides AC current to the respective motor over high-voltage transfer conductors. In regeneration control, the respective inverter receives AC current from the motor over transfer conductors. The net DC current provided to or from the inverters determines the charge or discharge operating mode of the ESD. Preferably, the machines 60, 70 are three-phase AC electrical machines and the inverters comprise complementary three-phase power electronic devices.

The powertrain control system gathers and synthesizes pertinent information and inputs, including the operator demand for power and output torque, and executes algorithms to control various actuators to achieve control targets, including such parameters as fuel economy, emissions, performance, driveability, and protection of hardware, including batteries of the ESD and motors 60, 70. The powertrain control system comprises the distributed control module architecture which includes the ECM, the TCM, and the TPIM. A hybrid control module ('HCP') provides overarching control and coordination of the aforementioned control modules. There is a User Interface ('UI') operably connected to a plurality of devices through which a vehicle operator typically controls or directs operation of the powertrain, including the transmission. Exemplary vehicle operator inputs to the UI include an accelerator pedal, a brake pedal, transmission gear selector, and, vehicle speed cruise control. Within the control system, each of the aforementioned control modules communicates with other control modules, sensors, and actuators via a local area network ('LAN') communications bus 6, which allows for structured communication of control parameters and commands between the various control modules.

The ECM is operably connected to the engine 10, and functions to acquire data from a variety of sensors and control a variety of actuators, respectively, of the engine 10 over a plurality of discrete lines. The ECM receives an engine torque command from the HCP, and generates a request for output torque from the driveline 98. Various parameters that are sensed by ECM include engine coolant temperature, speed and positions of the engine crankshaft 16, 22, manifold pressure, ambient air temperature, and ambient pressure. Various actuators that may be controlled by the ECM comprise fuel injectors, the VCR actuator, ignition modules (when used), valve actuation, and throttle control modules. The TCM is operably connected to the transmission 10 and functions to acquire data from a variety of sensors, including shaft speed sensors and hydraulic pressure sensors. The TCM controls actuation of the clutches 71, 72 and the brakes 62, 73, 88. The TPIM includes power inverters and motor controllers configured to receive motor control commands and control inverter states therefrom to provide motor drive or regeneration functionality. The TPIM monitors speeds of the electrical machines 60, 70, and generates motor torque commands to control the electrical machines 60, 70. Each of the aforementioned control modules of the control system is preferably a general-purpose digital computer comprising a central processing unit, read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each controller has a set of control algorithms, comprising resident program instructions and calibrations stored in ROM and executed to provide the respective functions of each computer. Information transfer between the various computers is preferably accomplished using the aforementioned LAN 6.

The invention has been described with specific reference to the embodiments and modifications thereto. Further modifications and alterations may occur to others upon reading and understanding the specification. It is intended to include all such modifications and alterations insofar as they come within the scope of the invention.

Having thus described the invention, it is claimed:

1. Powertrain, comprising:
an internal combustion engine including non-coaxial first and second torque output nodes comprising first and second crankshafts directly connected to corresponding ones of first and second torque input shafts of an electro-mechanical transmission; and,
the electro-mechanical transmission comprising non-coaxial first and second planetary gear sets rotationally operatively connected to corresponding ones of first and second electrical machines, the non-coaxial first and second planetary gear sets operatively connected to the corresponding ones of the first and second torque input shafts and selectively operatively connected to an output shaft.

2. The powertrain of claim 1, wherein the first torque input shaft is directly connected to a sun gear of the first planetary gear set.

3. The powertrain of claim 1, wherein the first torque input shaft is directly connected to a ring gear of the first planetary gear set.

4. The powertrain of claim 1, wherein the second torque input shaft is directly connected to a sun gear of the second planetary gear set.

5. The powertrain of claim 1:
wherein the non-coaxial first and second planetary gear sets comprise the second crankshaft operatively connected with the second planetary gear set operatively connected to the output shaft.

6. The powertrain of claim 1, further comprising:
a first rotational brake device operatively connected to elements of the first planetary gear set; and,
a second rotational brake device and a clutch device operatively connected to elements of the second planetary gear set.

7. The powertrain of claim 1, further comprising: a rotational brake device operatively connected to an element of the first planetary gear set.

8. The powertrain of claim 1, wherein the internal combustion engine including the non-coaxial first and second torque output nodes comprising the first and second crankshafts comprises:
an engine block comprising a cylinder,
a pair of opposed pistons inserted in the cylinder; and,
each piston operatively connected to one of the first and second crankshafts.

9. The powertrain of claim 2, wherein the first and second crankshafts are rotationally operatively connected to each other.

10. The powertrain of claim 9, wherein the rotationally operatively connected first and second crankshafts are selectively controllable to effect a variable compression ratio in the internal combustion engine.

11. The powertrain of claim 10, wherein the internal combustion engine comprises one of a homogeneous-charge compression-ignition engine, a two-stroke compression-ignition engine, and, a stratified-charge engine.

12. The powertrain of claim 1, further comprising a rotational brake device operatively connected to one of the non-coaxial first and second planetary gear sets.

13. The powertrain of claim 12, the powertrain operative in a continuously variable ratio.

14. The powertrain of claim 12, further comprising a plurality of clutch devices operatively connected to the planetary gear sets.

15. The powertrain of claim 12, further comprising a clutch device operatively connected to one of the non-coaxial first and second planetary gear sets and at least one additional rotational brake device operatively connected to the other of the non-coaxial first and second planetary gear sets.

16. The powertrain of claim 15, the powertrain operative in an underdrive fixed gear ratio by selective actuation of the rotational brake devices.

17. The powertrain of claim 15, the powertrain operative in an overdrive fixed gear ratio by selective actuation of the rotational brake devices.

18. The powertrain of claim 15, the powertrain operative in a reverse fixed gear ratio by selective actuation of the rotational brake devices.

19. The powertrain of claim 15, the powertrain operative in a direct drive fixed gear ratio by selective actuation of the clutch device.

20. Powertrain, comprising:
an internal combustion engine including non-coaxial first and second torque output nodes comprising first and second crankshafts directly connected to corresponding ones of first and second torque input shafts of an electro-mechanical transmission;
the electro-mechanical transmission comprising non-coaxial first and second electrical machines rotationally operatively connected to corresponding ones of first and second planetary gear sets selectively operatively connected to an output shaft; and,
a plurality of control modules operative to control the internal combustion engine and the electro-mechanical transmission to control magnitude of torque transmitted to the output shaft.

21. Powertrain, comprising:
an internal combustion engine including non-coaxial first and second torque output nodes operatively connected to corresponding ones of first and second torque input nodes of an electro-mechanical transmission; and,
the electro-mechanical transmission comprising non-coaxial first and second planetary gear sets rotationally operatively connected to corresponding ones of first and second electrical machines, the non-coaxial first and second planetary gear sets operatively connected to the corresponding ones of the first and second torque input nodes and selectively operatively connected to an output shaft, first and second rotational brake devices operatively connected to elements of the first planetary gear set; and, a rotational brake device and a clutch device operatively connected to elements of the second planetary gear set.

22. Powertrain, comprising:
an internal combustion engine including non-coaxial first and second torque output nodes operatively connected to corresponding ones of first and second torque input nodes of an electro-mechanical transmission; and,
the electro-mechanical transmission comprising non-coaxial first and second planetary gear sets rotationally operatively connected to corresponding ones of first and second electrical machines, the non-coaxial first and second planetary gear sets operatively connected to the corresponding ones of the first and second torque input nodes and selectively operatively connected to an output shaft, and a rotational brake device and first and second clutch devices operatively connected to elements of the second planetary gear set.

* * * * *